United States Patent
Guerrero et al.

(10) Patent No.: US 8,806,881 B2
(45) Date of Patent: Aug. 19, 2014

(54) SYSTEM FOR CONTROLLING THE THERMAL ENERGY OF A MOTOR VEHICLE ENGINE BY ADJUSTING THE FLUID ACTUATORS OF SAID SYSTEM

(75) Inventors: Pascal Guerrero, Rueil-Malmaison (FR); Philippe Jouanny, Guyancourt (FR); Ngy Srun Ap, Saint Rémy les Chevreuse (FR)

(73) Assignee: Valeo Systemes Thermiques, Les Mesnil Saint Denis (FR)

(*) Notice: Subject to any disclaimer, the term of this patent is extended or adjusted under 35 U.S.C. 154(b) by 1847 days.

(21) Appl. No.: 11/794,143

(22) PCT Filed: Dec. 23, 2004

(86) PCT No.: PCT/FR2004/003359
§ 371 (c)(1),
(2), (4) Date: Feb. 12, 2009

(87) PCT Pub. No.: WO2006/070079
PCT Pub. Date: Jul. 6, 2006

(65) Prior Publication Data
US 2009/0211542 A1     Aug. 27, 2009

(51) Int. Cl.
*B60H 1/32*     (2006.01)
(52) U.S. Cl.
USPC ............................................. 62/239; 62/244
(58) Field of Classification Search
CPC ...... B60H 1/00; F01P 7/165; F01P 2003/187; F02B 29/0493; Y02T 10/146
USPC ....................... 62/239–244, 434–35, 506–507
See application file for complete search history.

(56) References Cited

U.S. PATENT DOCUMENTS 5,215,044 A * 6/1993 Banzhaf et al. ............. 123/41.29
5,265,437 A * 11/1993 Saperstein et al. ............... 62/243
(Continued)

FOREIGN PATENT DOCUMENTS

DE    19622062 A1    12/1996
DE    19728724 A1    1/1999
(Continued)

OTHER PUBLICATIONS

Machine translation of Yu JP Patent No. 10073329A on May 5, 2011.*

(Continued)

*Primary Examiner* — Mohammad M Ali
(74) *Attorney, Agent, or Firm* — Osha Liang LLP

(57) ABSTRACT

A high-temperature circuit through which a high-temperature heat carrier fluid runs and which integrates a cooling radiator in which a cooling fluid flows, and a low-temperature circuit through which a low-temperature heat carrier fluid runs and which integrates a cooling radiator in which the cooling fluid flows, is disclosed. The pumps of the high- and low-temperature circuit form first actuators for running the heat carrier fluid though the circuits and second actuators for flowing the cooling fluids in the high- and low-temperature radiators, and sensors for detecting representative parameters of the cooling requirements of the high- and low-temperature circuits and for transmitting said parameters to a control unit. The transmitted parameters include at least one parameter related to the first actuators and at least one parameter related to the second actuators. The control unit adjusts the first and second actuators according to these parameters.

12 Claims, 4 Drawing Sheets

(56) References Cited

U.S. PATENT DOCUMENTS

| | | | |
|---|---|---|---|
| 5,353,757 A | | 10/1994 | Susa et al. |
| 5,421,169 A | * | 6/1995 | Benedict .................. 62/244 |
| 5,609,125 A | | 3/1997 | Ninomiya |
| 6,038,877 A | * | 3/2000 | Peiffer et al. .................. 62/244 |
| 6,045,482 A | * | 4/2000 | Nishar et al. .................. 477/107 |
| 6,308,664 B1 | | 10/2001 | Ambros et al. |
| 6,435,273 B1 | * | 8/2002 | Futernik .................. 165/202 |
| 6,450,275 B1 | | 9/2002 | Gabriel et al. |
| 6,978,628 B2 | | 12/2005 | Honda |
| 2005/0138942 A1 | * | 6/2005 | Grimm et al. .................. 62/180 |
| 2005/0160747 A1 | * | 7/2005 | Kaga et al. .................. 62/228.1 |
| 2006/0005790 A1 | * | 1/2006 | Braun et al. .................. 123/41.08 |

FOREIGN PATENT DOCUMENTS

| | | | |
|---|---|---|---|
| DE | 10360575 A1 | 7/2004 | |
| EP | 0678661 | 10/1995 | |
| EP | 1375216 A1 | 1/2004 | |
| JP | 10073329 A | * 3/1998 | ................ F25B 1/00 |

OTHER PUBLICATIONS

European Office Action for EP 1828559, mailed Jan. 6, 2010, 5 pages.

International Search Report issued in PCT/FR2004/003359 mailed on Jul. 1, 2005 (3 pages).

* cited by examiner

SYSTEM FOR CONTROLLING THE THERMAL ENERGY OF A MOTOR VEHICLE ENGINE BY ADJUSTING THE FLUID ACTUATORS OF SAID SYSTEM

The invention relates to a system for controlling the thermal energy of a motor vehicle.

It concerns, in particular, a management system for thermal energy developed by the thermal engine of an automotive vehicle, the system comprising a high-temperature circuit filled with a high-temperature heat carrier fluid included in the vehicle engine and a high-temperature cooling radiator, in which the high-temperature heat carrier fluid is in exchange relation with a cooling fluid; a low-temperature circuit running a low-temperature heat carrier fluid and integrating a low-temperature cooling radiator in which the low-temperature heat carrier fluid is in heat exchange relation with a cooling fluid; first actuators to circulate said high-temperature heat carrier fluid and low-temperature heat carrier fluid respectively in the high-temperature circuit and in the low-temperature circuit.

In this type of system, the high-temperature cooling circuit helps more particularly for cooling off the thermal engine of the vehicle. The high-temperature heat carrier fluid circulates at a generally high-temperature between 85° C. and 100° C.

In the low-temperature circuit, the heat carrier fluid must be at a lower temperature, i.e. around 40° C. to 60° C. It is in particular the case when the low-temperature circuit integrates the air-conditioning condenser. It is indeed considered, in a close future, to cool this condenser with a liquid heat carrier fluid, i.e. water, and not with air as in the conventional air-conditioning circuits. It is therefore necessary to produce cold heat carrier fluid by maximally optimizing engine thermal energy management.

Systems of this type have already been proposed (U.S. Pat. No. 5,353,757) that consist of two circuits, a high-temperature and a low-temperature circuits, running a same heat carrier fluid, generally water with an antifreeze such as ethylene glycol. This system consists of a unique cooling radiator eventually divided in two parts. The system can function according to three different configurations. In a first configuration, a portion of the cooling radiator is assigned to the high-temperature cooling circuit, while the other portion is assigned to the low-temperature cooling circuit. Or, the totality of the cooling radiator can be assigned to either the low-temperature circuit or the high-temperature circuit. A control box is supplied various parameters, namely the heat carrier fluid temperature at the outlet of the engine, and controls the switching from one configuration to the other according to these parameters.

However, a management system of this type does not take into account all external parameters and therefore thermal energy management is not optimized.

This invention has precisely for objective a thermal energy management system to remedy these inconveniences. This objective is reached by the fact that said system consists of second actuators to run the cooling fluids in the high-temperature radiator and in the low-temperature radiator, and by the fact that it includes, in addition, sensors capable of capturing parameters representative of the cooling needs for the high-temperature circuit and/or the low-temperature circuit, and to feed these parameters to a control unit of aforesaid system, said control unit regulating the first and second actuators according to said parameters.

Therefore, the purpose of the management system of the invention is not only for regulating the high and low-temperature heat carrier fluid circulation that runs in the high-temperature circuit and in the low-temperature circuit, respectively, but also for the external fluids (it could be the same external fluid) that helps extract calories from both cooling circuits. Taking into account at least one parameter related to the external cooling fluids is essential to ensure proper performances, in particular of the low-temperature cooling circuit.

In other words, the parameters supplied to the control unit consist of at least one parameter related to the first actuators and of at least one parameter related to the second actuators.

The first actuators are generally circulating pumps mounted respectively on the high-temperature circuit and on the low-temperature circuit. If the circulating pump of the high-temperature circuit is a mechanical pump directly driven by the engine, its spinning rate cannot be regulated since it depends exclusively upon the engine spin speed. Thus, it suffices, in this case, to regulate the actuator of the low-temperature circuit heat carrier fluid, which is the circulation pump of this circuit.

In a current embodiment, although non imperative, high and low-temperature radiators are liquid gas radiators and the cooling gas of these radiators is the atmospheric air outside the vehicle, the actuators of the high and low-temperature radiators consist of motor-fans groups forcing an external cooling air circulation through these radiators. Advantageously, the high-temperature radiator and the low-temperature temperature radiator are arranged one behind the other in order to be passed through by a same external air flow, then a unique actuator (a motor-fan group) being used for both radiators.

Advantageously, the first and second actuators are driven by a variation of their voltage, in other words by a variation of the voltage of the electrical engine that drives the pump or the fan.

The parameters representative of the cooling needs for the high and/or low-temperature circuits may include at least the temperature of the high-temperature circuit heat carrier fluid at the output of the engine, the air temperature of the engine admission, and the external atmospheric air temperature.

When the low-temperature circuit includes a condenser as part of an air-conditioning circuit using a compressor to compress a cryogenic fluid, the parameters representative of the high and/or low-temperature cooling circuit needs include in addition the air-conditioning circuit cryogenic fluid pressure at the output of the compressor.

The parameters representative of the cooling needs for the high and/or low-temperature circuits include in addition advantageously the heat carrier fluid temperature at the output of the low-temperature radiator, and the vehicle speed.

In a particular embodiment, the control unit uses a computation algorithm for each actuator, this actuator creates a series of intermediate values U1, U2, U3 . . . according to the parameters provided by the sensors, and selects the highest intermediate variable as this actuator voltage.

The intermediate variables U1, U2, U3, . . . may take a value zero, a minimal value, or obey a continuous or discontinuous law.

In an advantageous embodiment, the intermediate variables are generated by comparing the parameter value to the lower and upper threshold values of this parameter.

Advantageously, the control unit is set to use the low-temperature circuit circulation pump capacity before that of the motor-fan group.

A convenient manner to do this is to call upon aforementioned computation algorithms, which are thus designed to use the capacity of the low-temperature circuit circulation pump before that of the motor-fan group.

This result can be obtained by choosing lower low and high-threshold values for the computation algorithm of the low-temperature pump than for the computation algorithm of the motor-fan group power voltage.

Other characteristics and advantages of the invention will appear while reading the following description of embodiment examples provided as illustration in reference to the figures in appendix. In these figures FIG. 1 is a diagram of a management system for a motor vehicle thermal energy according to the invention;

Figure 1:
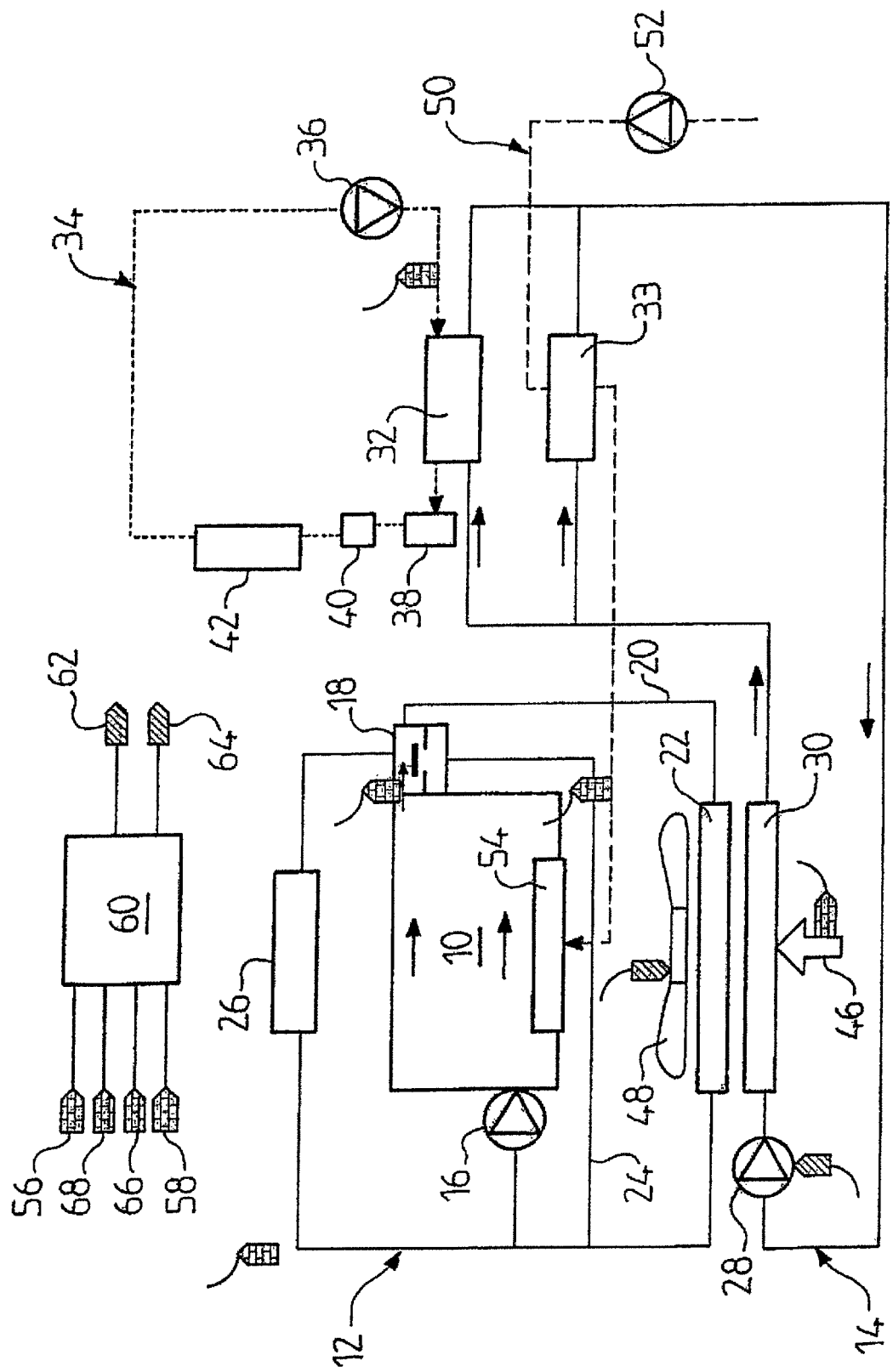

The management system of the thermal energy represented in FIG. 1 consists of a high-temperature circuit designated by general reference 12 and a low-temperature circuit designated by general reference 14. High-temperature circuit 12 includes a motor vehicle engine 10, a circulating pump 16 to circulate a heat carrier fluid in the high-temperature circuit. Said heat carrier fluid can be the same for low-temperature circuit 14, or each circuit may use different fluids.

A thermostat or a thermostatic valve 18 is placed at the output of engine 10 to circulate the heat carrier fluid, either through line 20 comprising a high-temperature heat exchanger 22, or through a bypass line 24. Heat exchanger 22 constitutes the main radiator of the vehicle providing mainly cooling for engine 10. High-temperature circuit 12 includes in addition a heating radiator 26, called aerotherm, supplying heating to the vehicle cabin.

High-temperature circuit 12 may include additional heat exchangers (not represented), i.e. an oil radiator, an exhaust cooling radiator, etc.

Low-temperature circuit 14 consists of a circulating pump 28. While pump 16 of the high-temperature circuit may be mechanical, pump 28 is always electrical. The circuit also consists of a low-temperature heat exchanger 30 and a condenser 32 part of an air-conditioning circuit for the vehicle cabin, designated as a whole by general reference 34.

The air-conditioning circuit is running a refrigerant fluid driven by compressor 36 placed upstream from condenser 32. The refrigerant fluid successively goes through condenser 32, tank 38, also called "bottle", regulator 40, evaporator 42, before returning to compressor 36. The operation of the air-conditioning circuit is traditional. Consequently, there will be no further details.

On the other hand, condenser 32 is particular in the sense that it is cooled by the heat carrier fluid of low-temperature circuit 14 instead of being cooled by an external air flow, as in traditional air-conditioning circuits.

Circuits 12 and 14 can be interconnected by switching means in order to have the heat carrier fluid passing from one circuit to the other. Or, as represented in the example, the circuits can be independent from one another. In the latter case, different heat carrier fluids for each circuit may be used.

In the example represented, radiator 22 of high-temperature circuit 12 and radiator 30 of low-temperature circuit 14 are arranged in parallel to one another and crossed by a same air flow 46. This advantageous layout makes use, in a classic way, of a unique motor-fan group 48 to force the air flow through radiators 22 and 30. However this embodiment implicates that it is not possible to control separately the air flows crossing each radiator. That's why, in an embodiment variation, radiators 22 and 30 could not be crossed by a same air flow and are equipped with independent motor-fan groups.

The management system in FIG. 1 also includes an air intake line into engine 10, designated by general reference 50. It includes a compressor 52 that compresses ambiant air, having for effect to steeply raise its temperature. Consequently, it must be cooled in previously mentioned supercharge air cooling 33 and part of low-temperature circuit 14. The cooled air is supplied to intake tubes 54 of engine 10.

The thermal energy management system just described is equipped with a number of sensors to capture operating parameters representative of the cooling needs for low-temperature circuit 14, but also for high-temperature circuit 12. In the example illustrated, an output temperature sensor 56 of the cooling water is found at the output of the engine and a temperature sensor 58 of ambiant air flow 46 upstream from low-temperature radiator 30. Therefore, sensor 56 provides information about the cooling need of high-temperature circuit 12.

Indeed, the higher the output water temperature, meaning the closer it gets to an acceptable peak value, the more the cooling need for the engine is important. Similarly, sensor 58 provides information about the cooling needs of low-temperature circuit 14, but also about high-temperature circuit 12. A low external air temperature results indeed in a cooling need reduction, and conversely, a high ambient air temperature results in an increased cooling need.

The parameters provided by sensors 56 and 58 are supplied to control unit 60 that regulates voltage 62 of pump 28 of low-temperature circuit 14, and power voltage 64 of motor-fan group 48.

Pump 16 constitutes an actuator of the heat carrier fluid of high-temperature circuit 12, and circulating pump 28 constitutes an actuator of the heat carrier fluid of low-temperature circuit 14. Similarly, motor-fan group 48 is an actuator of the external cooling fluid (ambient external air in the example described) of radiators 22 and 30. In the example, actuator 48 is common to both circuits 12 and 14 but, as previously mentioned, each circuit could have its own actuator. Thus, according to the invention, control unit 60 regulates the circulation of the heat carrier fluid at least in low-temperature circuit 14, as well as the circulation of forced cooling air 46 by actuator 48. Therefore, the system controls both fluids interacting in the operation of both cooling circuits, and not of only one.

In addition to both sensors 56 and 58, a number of supplemental sensors can be provided to improve the knowledge of and identify the cooling needs. In the example in FIG. 1, a temperature measurement sensor 66 is found on the air intake at the output of overcharge air cooling 33, as well as a sensor 68 installed on air-conditioning circuit 34 measuring the maximal pressure of the criogenic fluid at the output of compressor 36. This installation could be completed by adding sensors, i.e. a temperature measuring sensor at the water output after low-temperature radiator 30, or a vehicle speed sensor for instance.

Figure 2:
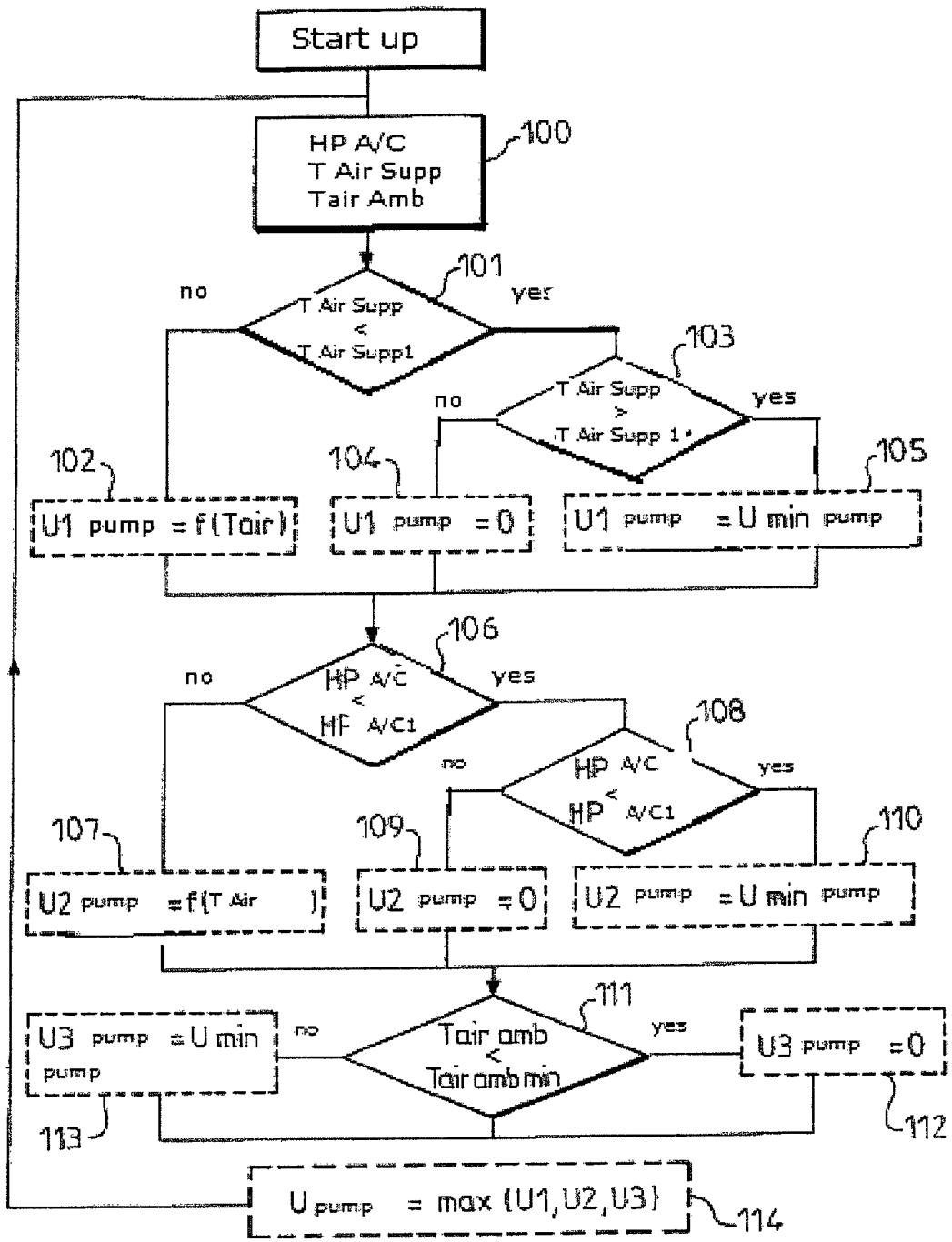
FIG. 2 is a control flowchart of the low-temperature circuit pump motor.

Represented in FIG. 2 is an example of a control flowchart of the electrical pump motor of the low-temperature circuit. After the engine starts up, the control parameters are read in step 100. In the example, said parameters are three e.g. the high pressure HP A/C of the air-conditioning circuit, the air intake temperature T Air Supp, and the ambient air temperature T Amb air.

First, a test is conducted on overcharge air water cooler 33 by comparing air intake temperature T Air Supp to a high-threshold value T Air Supp 1, for instance 40° C. If the air intake temperature is not lower than this high-threshold value, the intermediate variable U1 pump is equal to a function of the air temperature f (T air) in step 102. If the air intake temperature is lower than the high-threshold value T Air Supp 1, it is compared in step 103 to a low-threshold value T Air Supp 2. This low-threshold value is for example 20° C. If the air intake temperature is not greater than the low-threshold value, the intermediate variable U1 pump takes the value zero in step 104. On the contrary, it takes a minimal value U min pump in step 105.

The value of the first intermediate variable U1 being specified, a test is conducted on the water condenser in order to specify the second intermediate variable U2. In step 106, the air-conditioning circuit high pressure HP A/C, e.g. the value of the cryogenic fluid pressure at the output of the compressor, is compared to a high-threshold value HP A/C 1. This high-threshold pressure is for example 8 bars.

If the high pressure value of the air-conditioning circuit HP A/C is not less than the high-threshold value HP A/C 1, the intermediate variable value U2 pump is equaled to a high pressure function, f(HP A/C), of the air-conditioning circuit in step 107. If on the contrary, the air-conditioning circuit high pressure is less than the high-threshold value HP A/C 1, it is compared in step 108 to a low-threshold value HP A/C 2, for example 4 bars. If HP A/C is not higher than the low-threshold value, the intermediate variable U2 pump is equaled to zero in step 109. On the contrary, it is equaled a minimal value U min pump in step 110.

Finally, in a third step, a test is conducted on the motor-fan group in order to specify the third intermediate variable U3 pump. The ambient air temperature, T Air Amb, is compared to an ambiant air threshold value T Air Amb Min, set for example at 20° C., in step 111. If the ambient air temperature is lower than this threshold value, the variable U3 pump takes the value zero in step 112. On the contrary, intermediate variable U3 pump takes a minimal value U min pump in step 113.

Finally, in step 114, the control flowchart specifies the final value U pump of the voltage for the low-temperature circuit electrical pump. This value is equaled maximally to the three intermediate variables U1, U2, U3. Thereafter, the cycle restarts and new parameter values are read.

Figure 4:
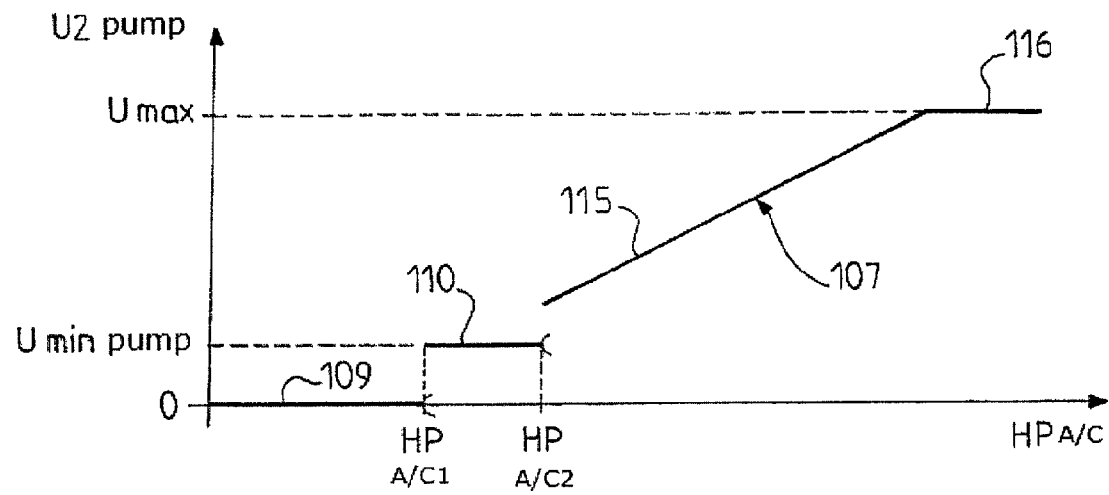
FIG. 4 is an example of regulation line for the intermediate voltage U2 of the low voltage circuit pump control flowchart in FIG. 2.

Represented in FIG. 4 are the regulation curve for intermediate variable U2 pump corresponding to the control flowchart in FIG. 2. It is verified that, for an air-conditioning circuit high pressure value less than low-threshold value HP A/C 1, the intermediate variable U2 takes the value zero designated by reference 109; for an air conditioning circuit high pressure value HP A/C between HP A/C 1 and HP A/C 2, the intermediate variable U2 takes a minimal pump value U min (reference 110).

Finally, for an air-conditioning circuit high pressure greater than high-threshold value HP A/C 2, the intermediate variable U2 is a function 107 of the air-conditioning circuit high pressure. In the example in FIG. 4, this function is made of two straight line segments 115 and 116. Variable U2 increases proportionally with the air-conditioning circuit high pressure until it reaches a value U max.

The control flowchart of the pump represented in FIG. 2 matches the case for which the low-temperature circuit includes both an overcharge air cooler and a vehicle cabin air-conditioning circuit that includes a water condenser. If the case arises where the vehicle does not include an overcharge air cooler, for example because the air supply is not compressed, in the flowchart in FIG. 2, the test part relative to the overcharge air cooler is deleted, the rest of the flowchart remains unaltered. In the same way, if the low-temperature cooling circuit does not include a water condenser because the vehicle is not equipped with air-conditioning, or else because the air-conditioning circuit uses a traditional air cooled condenser, the water condenser test part in the control flowchart in FIG. 2 is deleted, the rest of the control flowchart remains unaltered.

Figure 3:
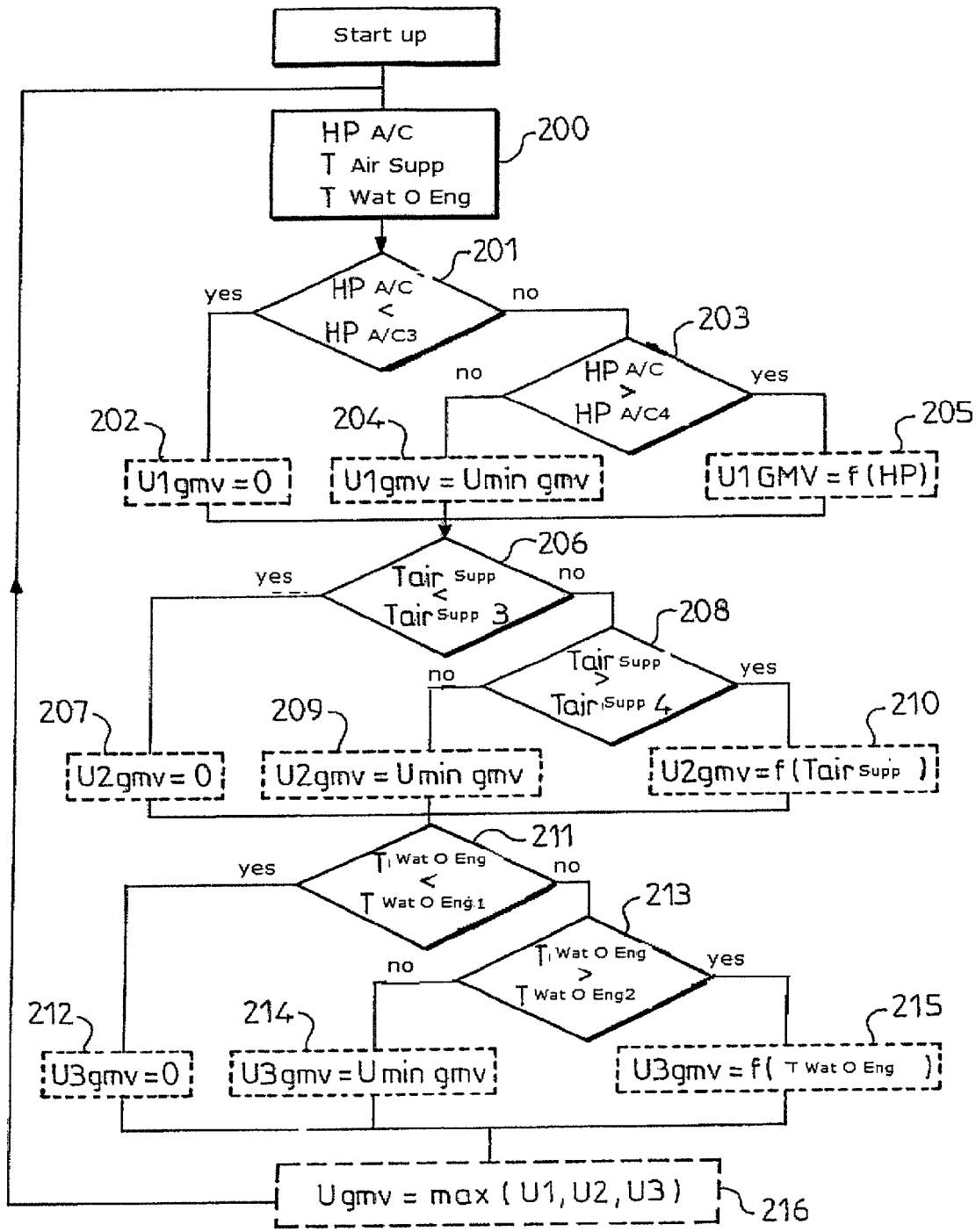
FIG. 3 is a control flowchart of the electrical motor of the motor-fan group.

Represented in FIG. 3 is a control flowchart of the motor-fan group voltage. After starting the vehicle engine, in step 200, the GMV control parameters are read, e.g. the air-conditioning circuit high pressure HP A/C, the air supply temperature T Air Supp, and the water temperature at the output of the motor T Wat O Eng.

In a first step, a test is conducted on water condenser 32. In step 201, the pressure value in the air-conditioning circuit at the condenser output, HP A/C, is compared to a low-threshold value HP A/C 3. This low-threshold value is, in the example, 12 bars. If the read value is lower than the low-threshold, in step 202, the intermediate variable U1 gmv is equaled to zero. If it is greater, in step 203, the value of the air-conditioning circuit high pressure is compared to a high-threshold value HP A/C 4. If the value is not less than this high-threshold, in step 204, the intermediate voltage value U1 gmv is equaled to a minimal voltage value, U min gmv. On the contrary, it is a function, f(HP), of the air-conditioning circuit high pressure (step 205).

In a second step, a test is conducted on the overcharge air cooler 33. The air supply temperature value T Air Supp is compared, in step 206, to a low-threshold value T Air Supp 3, i.e. 50° C. If the air supply temperature is lower than this low-threshold value, the intermediate variable U2 gmv is equaled to zero in step 207. On the contrary, in step 208, the air supply temperature is compared to a high-threshold value T Air Supp 4, i.e. 60° C. If the air supply temperature is not greater than this high-threshold, in step 209, the intermediate variable U2 gmv is equaled to a minimal value U min gmv. If on the contrary, the air supply temperature is greater than the high-threshold value, step 210, the intermediate variable U2 GMV is a function of the air supply temperature (see FIG. 5).

Finally, in a third step, a test is conducted on the motor vehicle engine. To this effect, in step 211, the water temperature at the output of the engine, T Wat O Eng, is compared to a low-threshold value T Wat O Eng 1. This value is, for example, 105° C. If the water temperature is lower than this low-threshold value, the intermediate variable U3 gmv is equaled to zero in step 212. On the contrary, it is compared to a high-threshold value T water S mot 2, i.e. 110° C. in step 213. If the water temperature is lower than this high-threshold value, intermediate variable U3 gmv is equaled to a minimal value U min gmv, in step 214. If on the contrary, the water temperature is greater than the high-threshold value, in step 215, the intermediate variable U3 gmv is a function of the water temperature at the output of the engine.

Finally, in step 216, the final control voltage U gmv is equaled to the peak value of the three intermediate variables U1, U2, U3. Thereafter, the cycle restarts and the three parameters are read again in step 200.

Similarly to the control flowchart of the low voltage circuit pump, if the vehicle does not include overcharge air cooler, the part of the flowchart relative to this cooling is deleted. If the vehicle does not include a water condenser, the flowchart portion relative to this condenser is deleted, the rest remains unchanged.

The threshold values for the control flowchart for the low-temperature pump and for the motor-fan group are chosen in order to use the pump cooling capacity in priority over that of the motor-fan group. To this effect, the chosen threshold values respectively for the water condenser test and the overcharge air cooler test are lower in the pump control flowchart. Thus, the low-threshold value of air supply temperature T Air Supp2 are taken equal to 20° C. for the pump, while at 60° C. for the motor-fan group. The high-threshold value of the air supply T Air Supp1 is taken equal to 40° C. for the pump, but at 50° C. for the motor-fan group. Similarly, the low-threshold value for water condenser high pressure HP A/C 2 is taken equal to 4 bars for the pump control, whereas low-threshold value HP A/C 3 of the control flowchart for the motor-fan group is equal to 12 bars. Similarly, high-threshold value HP A/C 1 of the pump control flowchart is taken equal to 8 bars, whereas high-threshold value HP A/C 4 is equal to 14 bars. It results in an optimized consumption of the low-temperature pump and motor-fan group actuators.

Figure 5:
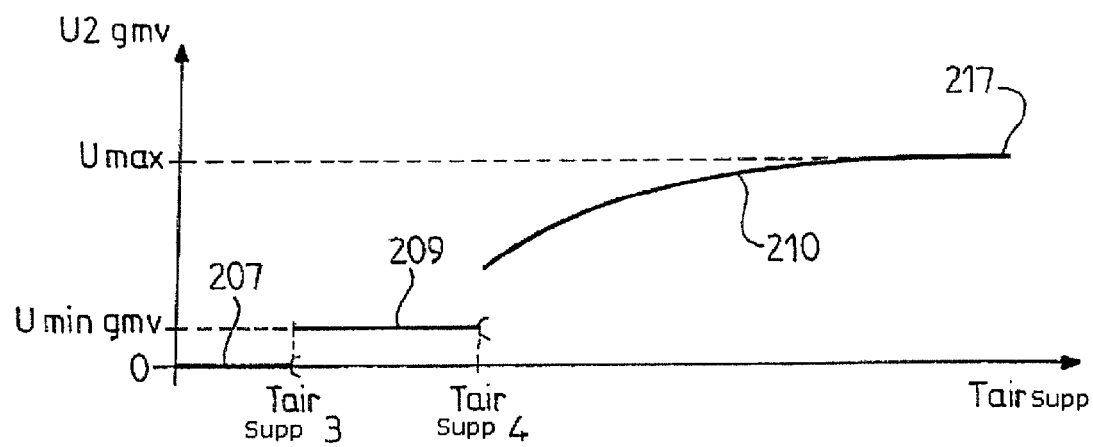
FIG. 5 is an example of regulation line for the intermediate voltage U2 of the motor-fan group control flowchart in FIG. 3.

Represented in FIG. 5 is the regulation line for intermediate variable U2 pump of the motor-fan group control assembly in FIG. 3. For an air supply temperature lower than the low-threshold value T Air Supp3, value U2 ynuv is checked to be zero (reference 207); for an air supply temperature value between the low and the high-thresholds, variable U2 gmv is equal to a minimal value U min gmv (reference 209). Finally, for an air supply temperature value higher than the high-threshold value (reference 210), variable U2 is a function of the air supply temperature increasing until a peak value U max 217 (reference 217).

What is claimed is:

1. A thermal energy management system developed by an automotive vehicle thermal engine, comprising:
   a high-temperature circuit running a high-temperature heat carrier fluid also including a vehicle engine, and a high-temperature cooling radiator through which the high-temperature heat carrier fluid is in an heat exchange relation with a cooling fluid;
   a low-temperature circuit running a low-temperature heat carrier fluid and integrating a low-temperature cooling radiator through which said low-temperature heat carrier fluid is in heat exchange relation with the cooling fluid;
   a plurality of first actuators to circulate the high-temperature heat carrier fluid and the low-temperature heat carrier fluid respectively in high-temperature circuit and in low-temperature circuit, wherein the plurality of first actuators are circulating pumps mounted on both high and low-temperature circuits;
   a plurality of second actuators to circulate cooling fluids in high and low-temperature radiators; and
   sensors to capture parameters representative of the cooling needs of the high-temperature circuit and/or the low-temperature circuit and to supply such parameters to a control unit in the management system, said control unit regulating the plurality of first and second actuators according to said parameters,
   wherein the high-temperature and low-temperature radiators are liquid/gas radiators, and wherein said cooling fluid is atmospheric air outside said vehicle, wherein the plurality of second actuators for the high and low-temperature radiators are motor-fan groups forcing cooling air circulation through the high and low-temperature radiators,
   wherein the control unit uses the capacity of a low-temperature circuit circulating pump before that of the motor-fan group by comparing at least one of the parameters to a high threshold value of the low-temperature circuit circulating pump,
   wherein the high threshold value of the low-temperature circuit circulating pump is less than a high threshold value of the motor-fan group,
   wherein when the at least one of the parameters is lower than the high threshold value of the low-temperature circuit circulating pump, the at least one of the parameters is compared to a low threshold value of the low-temperature circuit circulating pump, and
   wherein the low threshold value of the low-temperature circuit circulating pump is less than a low threshold value of the motor-fan group.

2. The management system according to claim 1, wherein the parameters supplied to the control unit include at least a parameter relative to the plurality of first actuators and at least a parameter relative to the plurality of second actuators.

3. The management system according to claim 1, wherein the high-temperature radiator and low-temperature radiator are arranged one behind the other in order to be crossed by the same cooling air circulation, a unique actuator being used for both radiators.

4. The management system according to claim 1, wherein the plurality of first and second actuators are driven by a variation of their power voltage.

5. The management system according to claim 1, wherein parameters representative of the cooling needs of high-temperature and low-temperature circuits include at least heat carrier fluid temperature of the high-temperature circuit at the output of engine, air supply temperature of engine, external atmospheric air temperature.

6. The management system according to claim 1, wherein the low-temperature circuit integrates a condenser being part of an air-conditioning circuit using a compressor to compress a cryogenic fluid, the parameters representative of the cooling needs of high-temperature and low-temperature circuits including in addition air-conditioning circuit cryogenic fluid pressure at the output of compressor.

7. The management system according to claim 1, wherein the parameters representative of the cooling needs of high-temperature and low-temperature circuits include in addition the heat carrier fluid temperature at the output of the low-temperature radiator and the vehicle speed.

8. The management system according to claim 4, wherein the control unit uses a computation algorithm for each of the plurality of first and second actuators, said algorithm creating a series of intermediate variables according to the parameters provided by the sensors and selecting the highest intermediate variable as the actuator voltage.

9. The management system according to claim 8, wherein the intermediate variables can take a null value, a minimal value, or obey a continuous or discontinuous law.

10. The management system according to claim 8, wherein the intermediate variables are specified by comparing the parameter value read to predefined high-threshold value and low-threshold value.

11. The management system according to claim 8, wherein the computation algorithm is designed to use the capacity of the low-temperature circuit circulating pump before that of motor-fan group.

12. The management system according to claim 11, wherein the high-threshold values and low-threshold values of the control algorithm for the low-temperature pump are chosen higher for the computation algorithm of the motor-fan group in order to use the cooling capacity of the pump before that of the motor-fan group.

* * * * *